United States Patent
Baert et al.

(10) Patent No.: US 7,946,745 B2
(45) Date of Patent: May 24, 2011

(54) SYSTEM FOR MOUNTING A HEADLIGHT ON A MOTOR VEHICLE AND A MOTOR VEHICLE COMPRISING SUCH A SYSTEM

(75) Inventors: Christophe Baert, Cedex (FR); Malik Bakacha, Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/244,501

(22) Filed: Oct. 5, 2005

(65) Prior Publication Data

US 2006/0072333 A1    Apr. 6, 2006

(30) Foreign Application Priority Data

Oct. 5, 2004 (FR) ..................... 04 10507

(51) Int. Cl.
*B60Q 1/00* (2006.01)
*F21V 7/04* (2006.01)

(52) U.S. Cl. ........ 362/549; 362/464; 362/469; 362/462; 362/487; 362/496; 362/507; 362/523; 362/529; 362/530

(58) Field of Classification Search .......... 362/459–549; 180/271–289
See application file for complete search history.

(56) References Cited

U.S. PATENT DOCUMENTS

| | | | | |
|---|---|---|---|---|
| 2,254,790 A * | 9/1941 | Benton | .......................... | 362/523 |
| 3,646,339 A * | 2/1972 | Yssel | .......................... | 362/507 |
| 4,070,051 A * | 1/1978 | Peter | .......................... | 362/505 |
| 4,860,173 A * | 8/1989 | Jocher et al. | .................. | 362/546 |
| 4,947,295 A * | 8/1990 | Carrell | .......................... | 362/513 |
| 5,635,899 A * | 6/1997 | Carlo et al. | .................... | 180/287 |
| 7,252,419 B1 * | 8/2007 | James | .......................... | 362/515 |

FOREIGN PATENT DOCUMENTS

| | | |
|---|---|---|
| DE | 19955648 | 5/2000 |
| EP | 0422405 A1 | 4/1991 |
| EP | 0933253 A2 | 8/1999 |
| EP | 1024075 A1 | 8/2000 |
| EP | 1103417 | 5/2001 |
| EP | 1 346 874 A1 | 9/2003 |

OTHER PUBLICATIONS http://architecture.arizona.edu/courses/arc103/trad103/tutorials/fundamentals/glossary/General.html.*
http://wordnet.princeton.edu/perl/webwn?s=curvilinear.*
French Search Report dated May 13, 2005.
DIALOG English language Abstract for EP 1 346 874, Sep. 26, 2003.

* cited by examiner

*Primary Examiner* — Sharon E Payne
*Assistant Examiner* — William J Carter
(74) *Attorney, Agent, or Firm* — Locke Lord Bissell & Liddell LLP

(57) ABSTRACT

A system for mounting a headlight on a motor vehicle comprising a rigid housing closed by a protective glass. The system comprising: a first connecting element fixed to the headlight, a second connecting element fixed to the motor vehicle, the first and second connecting elements being assembled so as to slide one in the other. The first and second connecting elements are curved and mounted at least partially about a center of rotation of the headlight providing rotational movement of the headlight.

18 Claims, 5 Drawing Sheets

SYSTEM FOR MOUNTING A HEADLIGHT ON A MOTOR VEHICLE AND A MOTOR VEHICLE COMPRISING SUCH A SYSTEM

FIELD OF THE INVENTION

The present invention concerns a system for mounting a headlight on a motor vehicle making it possible to move the headlight with respect to the vehicle during a frontal collision with an obstacle. This mounting system in particular allows a rotation of the headlight with respect to the vehicle.

The invention finds applications in the field of motor vehicles and in particular in the field of the safety of pedestrians and the safety of motor vehicles in the case of frontal collision or collision with a pedestrian.

PRIOR ART

In the automobile field, it is sought more and more to protect the vehicle in the case of collision with an obstacle in order to preserve to the maximum possible extent the cabin of the vehicle as well as its engine environment in order to reduce the cost of repairs. Such collision with an obstacle may be a pedestrian impact or a frontal impact. Frontal impact is a collision of the vehicle, at various speeds and at various angles, with a fixed or moving obstacle. Pedestrian impact is a collision with an adult or child pedestrian at various speeds.

Moreover, a new European Directive has been drawn up aimed at protecting pedestrians during an impact between a pedestrian and a vehicle or part of this vehicle, in particular a vehicle headlight.

Currently it is known how to use, in certain vehicles, a headlight held on the motor vehicle by fixing lugs. These fixing lugs are designed to break during a frontal impact or a pedestrian impact so as to disconnect the headlight from the vehicle.

Two cases may then present themselves. In the case of an impact at low speed with an obstacle or pedestrian, the headlight retracts over short distance, and can be repaired at small cost if its fixing lugs are replaceable. The injuries caused to the pedestrian are then generally not serious.

In the case of an impact at a high speed with an obstacle or pedestrian, the headlight is more severely damaged, as is the engine environment because of the impact of the headlight. The injuries inflicted on the pedestrian may then be serious.

There are also known headlights which, instead of being disconnected from the vehicle during a frontal impact or pedestrian impact, move along the vehicle. Such a vehicle headlight is described in the document EP-A-1-1 346 874. An example of this headlight is shown in FIG. 1. More precisely, FIG. 1 shows the front of a vehicle 1 equipped with a headlight 2. This headlight 2 emits a light beam directed essentially towards the front of the vehicle 1, that is to say along the axis of the road. This headlight 2 comprises a housing not shown in FIG. 1, closed by a protective glass 3 forming the exit face of the headlight 2. The headlight 2 comprises two zones:
- a central zone 4 forming the most flexible part of the headlight 2 since it comprises the protective glass; this central zone 4 is also called the frontal zone;
- a lateral zone 5, surrounding the frontal zone 4.

This lateral zone 5 comprises part of the housing.

The headlight 2 also comprises fixing lugs, or connecting members providing a movement of the headlight 2 towards the rear of the vehicle 1 during a frontal impact or a pedestrian impact. The connecting members comprise two different guide means providing respectively a sliding of the headlight 2 towards the rear and towards the side of the wing 6 of the vehicle 1. The sliding of the headlight 2 towards the rear of the vehicle 1 and the sliding of the headlight 2 towards the side of the wing 6 of the vehicle 1 are two combined linear movements.

The movement of the headlight 2 towards the side of the wing 6 of the vehicle 1 permits a release of the headlight 2. However, this release of the headlight 2 towards the side of the wing 6 causes a collision of the headlight 2 against the edge of the wing 6 of the vehicle. The headlight 2 then ends it movement in the engine environment of the vehicle. In other words, the headlight 2 is crushed against one or more of the engine environment elements of the vehicle 1, thus creating much damage in the engine environment of the vehicle 1, in addition to the demolition of the wing 6 of the vehicle 1.

The movement of the headlight 2 towards the rear of the vehicle 1 absorbs part of the energy generated by the impact, since this movement is limited by the engine environment of the vehicle. However, this absorption of energy is not sufficient to satisfy the new standards: the protection of the pedestrian is not sufficiently ensured.

In addition the kinematics of sliding of the headlight 2 comprises, in the case of a pedestrian impact, a significant risk of injuring the pedestrian. This is because, during a pedestrian impact, the sliding of the headlight 1 towards the rear of the vehicle propels the pedestrian onto the lateral zone 5 of the headlight 2, which is a rigid zone of the said headlight and therefore dangerous for the pedestrian.

DISCLOSURE OF THE INVENTION

The aim of the invention is precisely to remedy the drawbacks of the techniques mentioned above. To this end, the invention proposes a system for mounting a headlight on a motor vehicle in which, during a pedestrian impact, the headlight is moved in rotation about a chosen center of rotation. The headlight comprises a first connecting element and the motor vehicle comprises a second connecting element. These connecting elements are curved and adapted to each other in order to ensure the rotation of the headlight during a frontal impact or a pedestrian impact.

More precisely, the invention concerns a system of mounting a headlight on a motor vehicle, this headlight comprising a rigid housing closed by a protective glass, the said system comprising:
- a first connecting element fixed to the headlight,
- a second connecting element fixed to the vehicle,
- the first and second connecting elements being assembled so as to slide one in the other,
- wherein the first and second connecting elements are curved and mounted at least partially about a center of rotation of the headlight, providing a rotary movement of the headlight during a collision.

The invention can also comprise one or more of the following characteristics:
- a position of the center of rotation of the headlight is determined according to a shape of the protective glass of the headlight;
- the position of the center of rotation is determined according to an optimum position of the headlight for the purpose of its movement;
- the center of rotation of the headlight is centered on the center of gravity of the said headlight;
- the first connecting element is fixed to a lateral zone of the headlight;

the second connecting element forms a guide path and the first connecting element is an element guided by the guide path;

the guide path and the guided element comprise at least one mechanical braking means;

the guide path has a crenellated shape and the guided element has a T shape, adapted to be inserted successively between crenellations of the guide path;

the guide path has a tapered shape and the guided element has a tapered shape, adapted to be inserted in the guide path;

the mounting system comprises a ramp for sliding the headlight under a turned-over edge of a wing of the vehicle;

the ramp is mounted on the protective glass of the headlight;

the ramp is fixed to the housing of the headlight;

a piece is placed at one end of the ramp;

the ramp is faceted in the protective glass of the headlight.

The invention also concerns a motor vehicle comprising at least one headlight mounted on the motor vehicle by means of a mounting system according to the invention.

DETAILED DESCRIPTION OF EMBODIMENTS OF THE INVENTION

Figure 2:
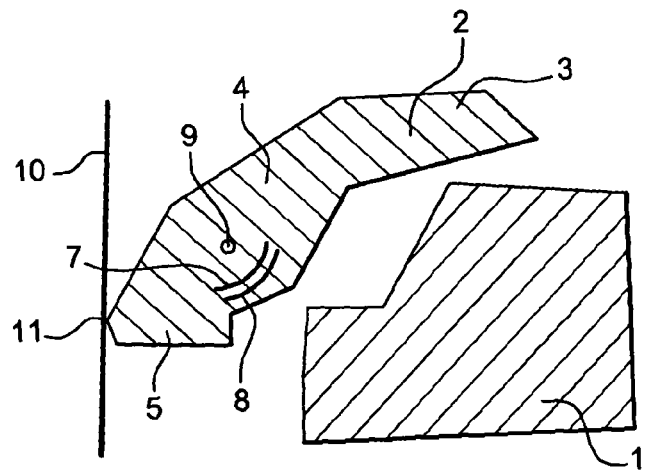
FIG. 2, FIG. 3 and FIG. 4 depict schematically the system of the invention at various phases of movement of the headlight 2.

The invention concerns a system for mounting a headlight on a motor vehicle allowing a rotation of the headlight with respect to the vehicle during a collision. An example of a mounting system according to the invention is depicted in FIG. 2. This FIG. 2 shows a headlight, a vehicle and the system for mounting the headlight on the vehicle in a schematic fashion.

For better understanding, throughout the description of the kinematics of rotation of the headlight according to the invention, the vehicle and the headlight shows schematically in FIGS. 2 to 7 in two blocks. A first block represents the vehicle 1 and a second block represents the headlight 2. The mounting system is depicted on the second block, for reasons of simplification.

The headlight 2 is fixed to the vehicle 1 by the mounting system of the invention. This mounting system comprises two connecting elements 7 and 8. The first connecting element 7 is mounted on the headlight 2 in the lateral zone of the headlight. Lateral zone means a zone of the headlight 2 comprising the rigid housing of the headlight 2. The second connecting element 8 is mounted on the vehicle 1, for example on the chassis of the vehicle.

The connecting elements 7 and 8 have structures adapted to slide one in the other. The connecting element 8 is a guidance device for supporting and guiding the connecting element 7. It constitutes a guide path for the connecting element 7. The connecting element 8 may for example be a rail. The connecting element 8 may also be a slide or any other structure allowing the sliding of the connecting element 7.

The connecting element 7 is a guided element, adapted to slide in the connecting element 8. This connecting element 7 may for example be a runner.

The connecting element 7 and the connecting element 8 may be of identical length as shown in FIG. 2. The connecting element 7, or the guided element 7, may also have a shorter length than the connecting element 8, or rail 8.

The rail 8 and the guided element 7 have a curved or circular shape, providing a circular movement of the guided element 7. The rail 8 is fixed to the vehicle 1 so that the headlight 2 is able to move with respect to the vehicle 1. The movement of the guided element 7 in the rail 8 automatically causes a rotation movement of the headlight 2.

The guided element 7 and the rail 8 are mounted at least partially around the center of rotation 9 of the headlight 2. This center of rotation 9 is defined by simulation and/or experimentation for an optimum rotation of the headlight 2. In the normal position, that is to say without an impact, the rail 8 and the guided element 7 are circumscribed, the rail 8 being external to the guided element 7.

In other words the guided element 7 and the rail 8 form arcs of a circle mounted around the center of rotation 9. The center of rotation 9 therefore forms the center of circles passing through the guided element 7 and the rail 8, the distance between the center of rotation 9 and the rail 8 being greater than the distance between the center of rotation 9 and the guided element 7.

In a variant of the invention, the guided element 7 and the rail 8 are fixed to each other by detachable fixing means, that is to say able to detach or break in the event of impact. Thus, in normal operation, the headlight 2 is immobile with respect to the vehicle 1. In the event of impact, the fixing means detach, allowing the sliding of the connecting element 7 in the rail 8.

Figure 3:
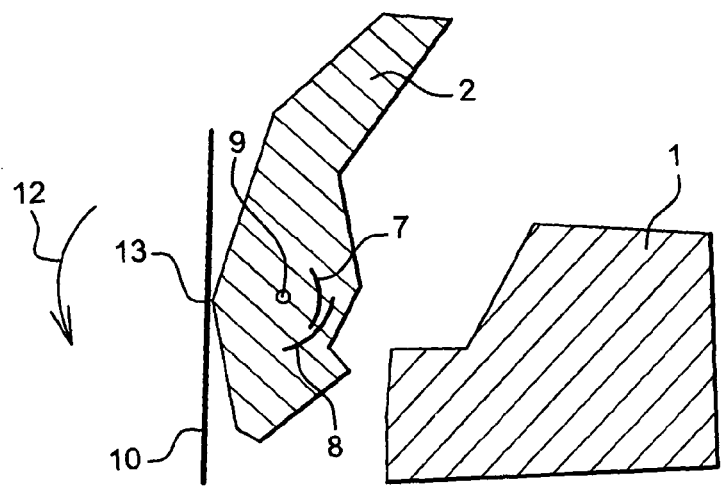
Figure 4:
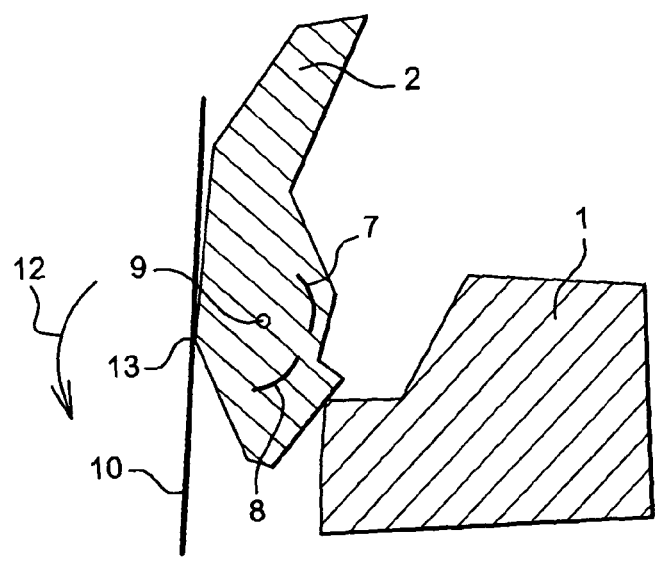

FIGS. 2, 3 and 4 show the kinematics of a vehicle 1 coming into collision with an impacter 10. This impacter 10 represents a pedestrian or any other object coming into collision with the vehicle 1 from the front. Throughout the description, the impacter 10 will be considered to be a pedestrian, knowing that it may be a case of any other frontal obstacle. The impacter 10 is depicted in FIGS. 2, 3, 4 by a substantially inclined solid line.

During a frontal impact, the impacter 10 comes into contact with a surface 11 of the lateral zone 5 of the headlight 2. The intensity of the collision force between the impacter 10 and the headlight 2 causes the breakage of the means of fixing the guided element 7 on the rail 8, where such fixing means exist.

The collision force, at the moment of impact, causes a movement of the guided element 7 on the rail 8, as shown in FIG. 3. This movement of the guided element 7 on the rail 8 causes the tilting of the headlight 2 with respect to the vehicle 1. This tilting of the headlight 2 corresponds to a rotation movement of the headlight 2 about the center of rotation 9. This rotation movement is made in a direction of rotation 12 defined at the time of design of the headlight 2.

The effect of the rotation of the headlight 2 is to move the impact surface 11 of the impacter 10. This surface 11 moves towards the central zone 4 or frontal zone of the headlight 2, that is to say towards the most flexible zone of the headlight 2 since it is the center of the protective glass 3. The impact surface 11 moved is called and referenced "the impact surface 13". This rotation of the headlight 2 releases the said headlight towards the side of the wing of the vehicle 1, thus enabling the headlight 2 not to strike against the engine environment of the vehicle 1 during its rotation.

The final position of the headlight 2 with respect to the impacter 10 and the vehicle 1 at the end of the guided element 7 on the rail 8 is shown in FIG. 4. The end of the movement of the guided element 7 on the rail 8 causes the end of the rotation of the headlight 2 about the center of rotation 9. This movement terminates when the guided element 7 reaches a stop on the rail 8, or when the guided element 7 leaves the rail 8, as shown in FIG. 4.

At the end of rotation, the impact surface 13 is situated on the front zone 4 of the protective glass 3. This surface 13 is the final impact surface of the impacter 10 on the headlight 2. This final surface 13 is a flexible zone of the headlight 2 and therefore a less dangerous zone for the pedestrian, when it is a case of a pedestrian impact.

In addition, the rotation of the headlight 2 absorbs part of the energy generated by the collision between the impacter 10 and the vehicle 1. This absorption of energy has the effect of substantially decreasing the energy received by the impacter 10, in particular when the impacter 10 represents a pedestrian. The safety of the pedestrian is improved thereby. Moreover, this rotation of the headlight 2 makes it possible for the headlight not to enter the vehicle 1 with the entire force of the impact. The engine of the vehicle 1, which is one of the most expensive elements of the vehicle 1, as well as the engine environment, are thus protected. Damage to the vehicle 1 is therefore limited and the cost of repairing the vehicle 1 is considerably reduced.

As explained previously, the rotation of the headlight 2 is established around the center of rotation 9. This center of rotation 9 is defined according to the optimum final position of the headlight 2 with respect to the impacter 10. In other words, the position of the center of rotation 9 is predefined for each headlight according in particular to the normal position of the headlight 2 on the vehicle 1 and the final position required after rotation. Examples of a definition of the center of rotation 9 are shown in FIGS. 5 and 6.

Figure 1:
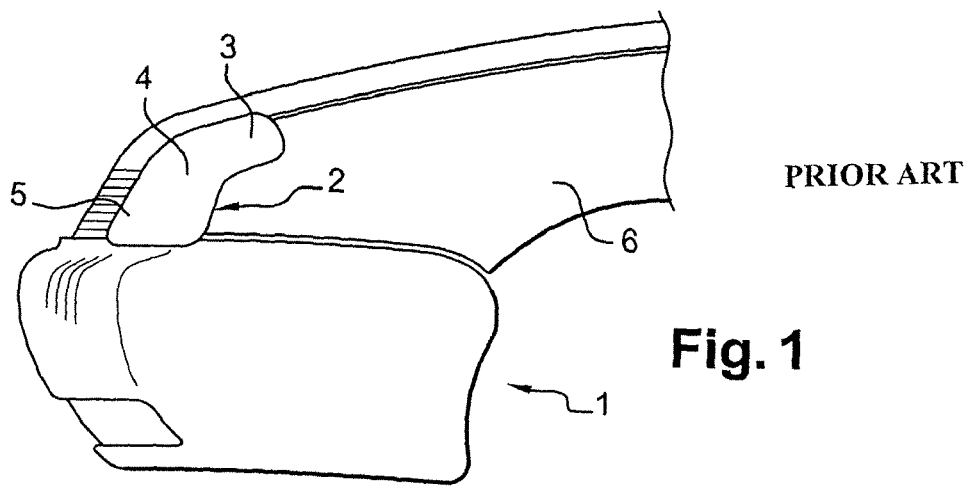
FIG. 1, already described, depicts the front of a motor vehicle equipped with a headlight.
Figure 5:
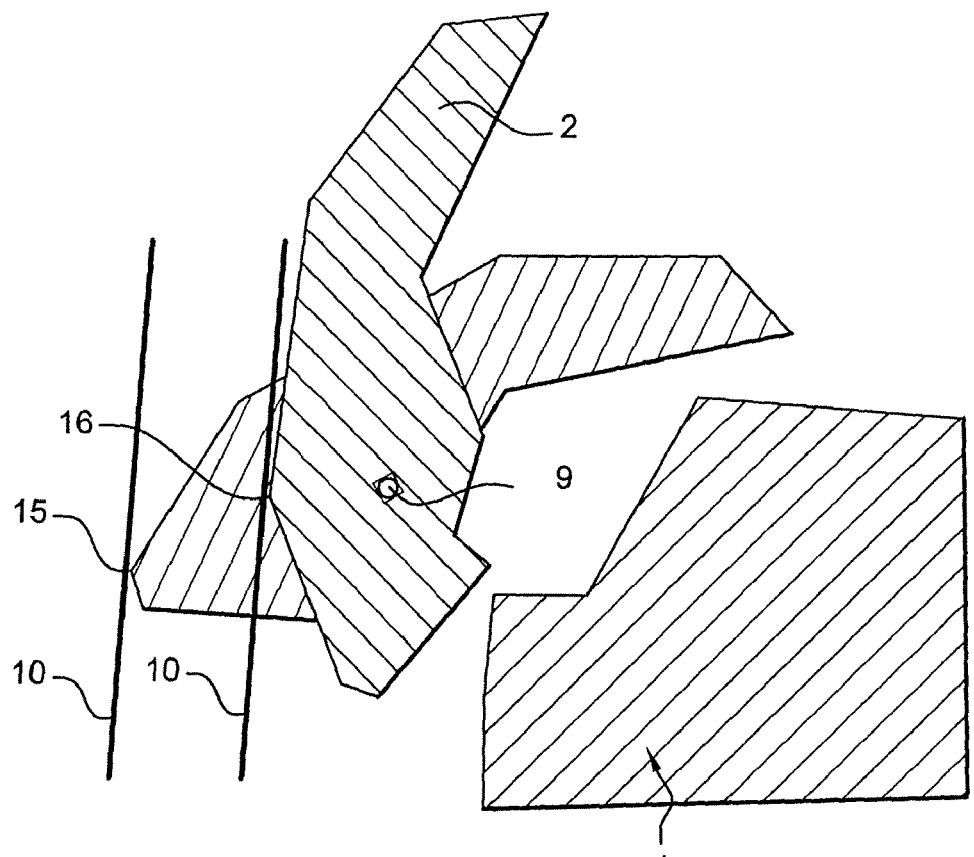
FIG. 5 depicts schematically an example of a position of the center of rotation of the headlight.

FIG. 5 shows the center of rotation 9 of the headlight 2 with respect to various positions of the impacter 10. The center of rotation 9 is determined at the time of design of the headlight 2, it may be chosen at any point on the headlight 2. The choice of the center of rotation 9 is preferably made by simulation and optimisation. It is defined taking account of the shape of the headlight 2 and that of the vehicle 1. It is also defined according to an initial position of the headlight 2 and an optimum final position of the headlight on the impacter 10. The initial position is the position in which the headlight 2 is situated in normal functioning. In the example in FIG. 5, the impacter zone 15 is chosen as the initial position. The final position corresponds to the position of the headlight 2 against the impacter 10, at the end of the impact. The frontal zone 4 of the headlight 2 is preferably chosen as the final position. The final position is represented, in FIG. 5, by the impact surface 16. The center of rotation 9 can also be movable. In this case, the position of the center of rotation 9 depends on the intensity of the collision force between the vehicle 1 and the impacter 10 as well as the initial and final positions of the headlight 2 with respect to the impacter 10. In a variant, the center of rotation 9 is centered on the center of gravity of the headlight 2, causing the transformation of the translation energy into rotation energy in an optimum fashion.

Figure 6:
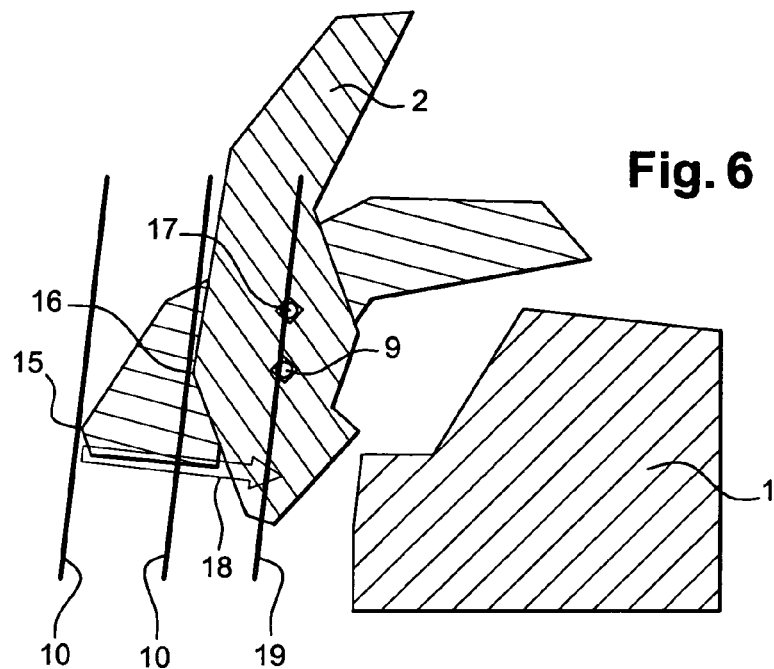
FIG. 6 depicts schematically a position of the center of rotation with respect to the center of gravity of the headlight.

In another variant, the center of rotation 9 is different from the center of gravity, as shown in FIG. 6. This is because FIG. 6 shows an optimum position of the center of rotation 9, where the center of rotation 9 is not the center of gravity 17 of the headlight 2.

The center of rotation 9 is chosen so as to be aligned with the center of gravity 17. This alignment is represented by a straight line 19. This straight line 19 is preferably parallel to the impacter 10 in the initial position and to the impacter 10 in the final position. It is perpendicular to the impact force 18, representing the energy generated at the time of the impact between the vehicle 1 and the impacter 10. The center of rotation 9 can be any point on the straight line 19. The center of rotation 9 is also chosen according to the distance between the impact force 18 and the center of rotation 9 and the distance between the center of gravity 17 and the center of rotation 9. The rotation of the headlight 2 is optimised when the distance from the impact force 18 to the center of rotation 9 is greater than the distance from the center of gravity 17 to the center of rotation 9.

As explained previously, the rotation of the headlight 2 gives rise to an absorption, by the headlight, of part of the energy being generated by the collision of the vehicle 1 with the impacter 10. In other words, part of the energy generated by the collision is dissipated in the rotating headlight 2. To increase this dissipation of energy further, the guided element 7 and the rail 8 comprise mechanical braking structures. These mechanical braking structures slow down the rotation movement of the headlight 2, thus absorbing part of the collision energy.

Figure 7:
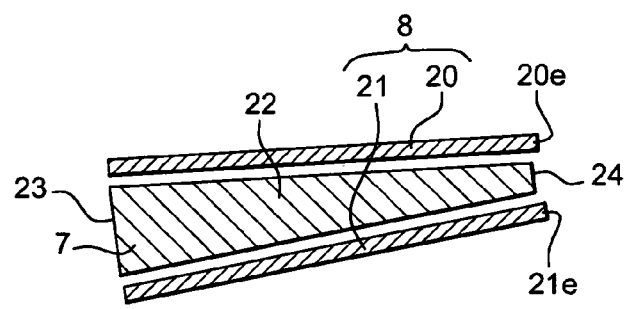
FIG. 7 and FIG. 8 depict respectively first and second embodiments of the connecting elements the invention.

FIG. 7 shows a first embodiment of this braking system. In this embodiment, the rail 8 comprises two non-parallel rectilinear structural bars 20 and 21 able to form a non right angle at their ends 20e and 21e. The rail 8 therefore has a tapered shape. The guided element 7 comprises a tapered piece 22, the shape of which is adapted to be inserted between the bars 20 and 21 of the rail 8. The piece 22 of the guided element 7 has a width digressive from an end 23 to an end 24.

In this braking system, the bars 20 and 21 of the rail 8 receive the piece 22 of the guided element 7. In a variant, the guided element 7 and the rail 8 are produced from flexible materials. These flexible materials have the property of partially or totally resuming their shape and volume after having lost them by compression or extension. The piece 22 of the guided element 7 then constitutes a deformable membrane that transmits, to the bars 20 and 21 of the rail 8, the impact force received by the vehicle 1 on collision with the impacter 10. The tapered shape of the rail 8 slows down the movement of the guided element 7 on the rail 8, causing a slowing down of the rotation movement of the headlight 2.

Figure 8:
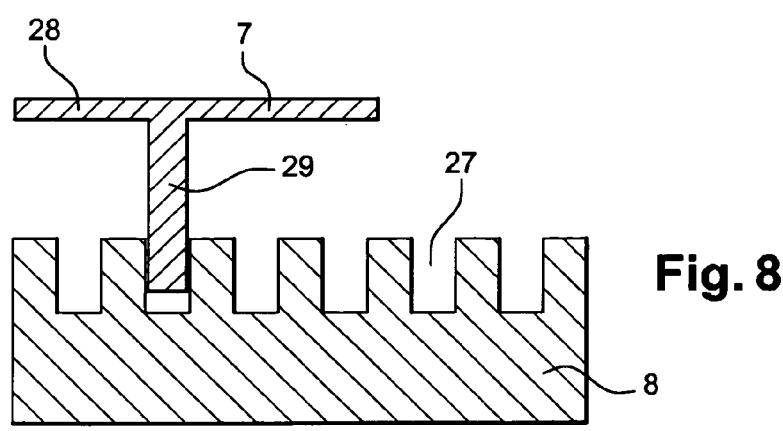

Another embodiment of the braking system is shown in FIG. 8. In this embodiment, the rail 8 has a crenellated shape, that is to say is comprises several crenellations 27. The guided element 7 has a T shape intended to fit on the rail 8. For this purpose, the guided element 7 comprises a branch 28 and a branch 29 perpendicular to the branch 8. The branch 29 has a length adapted to the height of the crenellations 27 on the rail 8.

When the vehicle 1 collides with the impacter 10, the guided element 7 moves on the rail 8 by successive ruptures. In other words, under the effect of the impact force, the branch 28 jumps from one crenellation 27 to another crenellation, each jump absorbing a little energy.

The moving of the guided element 7 on the rail 8, by successive ruptures, therefore causes the slowing down of the rotation movement of the headlight 2.

Figure 10:
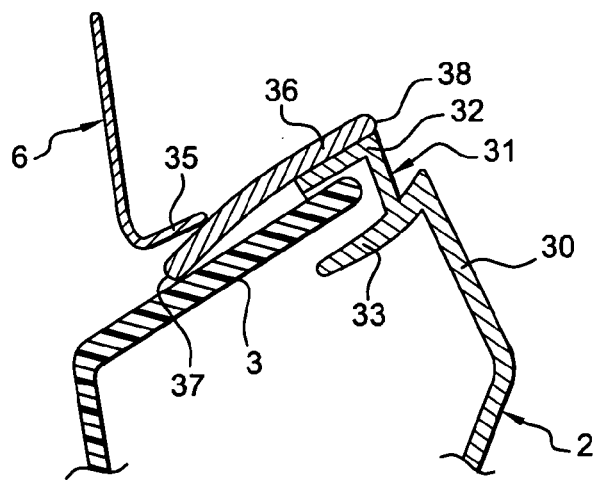
Figure 11:
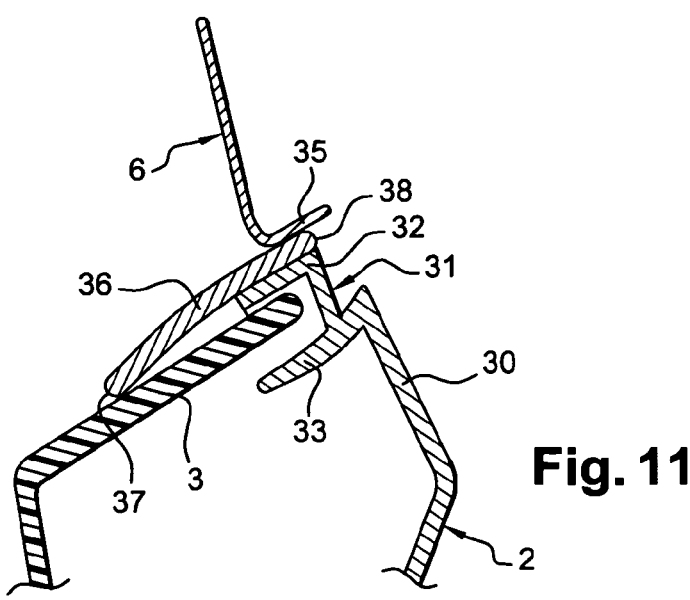

In one embodiment of the invention, a sliding ramp is provided to provide the release of the headlight 2 towards the wing 6 of the vehicle 1, without damaging the wing nor the lining of this wing. This embodiment is depicted in FIGS. 9 to 11 showing the kinematics of the system during a collision.

Figure 9:
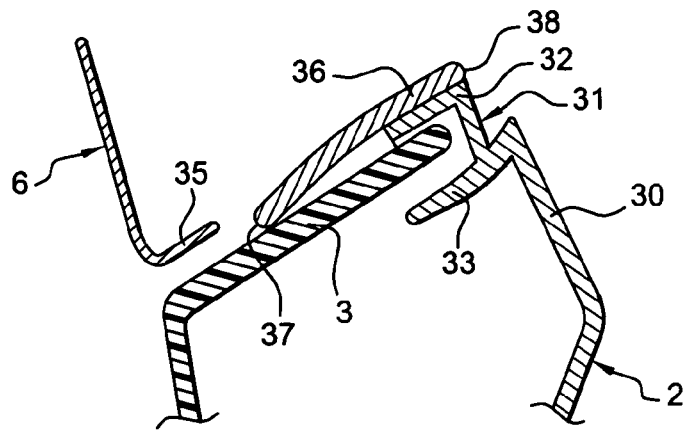
FIG. 9, FIG. 10 and FIG. 11 depict a ramp for sliding the headlight under a turned-over edge of the wing of the vehicle.

More precisely, FIG. 9 depicts the wing 6 of the vehicle and an example of a headlight 2 equipped with a sliding ramp 36. Like the majority of current headlights, the headlight 2 comprises a rigid bar 30, for example made from metal. This bar 30 comprises at its end a U-shaped piece 31, comprising a leg 32 and a leg 33. The leg 33 is situated between the protective glass 3 and bar 30. The leg 32 is situated in the engine environment of the vehicle. The protective glass 3 is generally embedded in the space formed by the legs 32 and 33.

The wing 6 of the vehicle comprises an end 35 pressed in an L-shape. This end constitutes the turned-over edge of the wing. In the normal position of the headlight 2, the end 35 is separated from the leg 32.

When the vehicle collides with the impacter, the headlight 2, by a rotation movement described previously, is released towards the side of the wing 6 of the vehicle. When the said headlight rotates, the leg 32 can strike the turned-over edge 35 of the wing 6 of the vehicle, then causing the deformation of the wing 6.

The sliding ramp 36 of the invention, produced for example from plastics material, makes it possible to slide the leg 32 under the turned-over edge 35 of the wing 6. For this purpose, the ramp 36 is fixed in the lateral zone 5 of the headlight 2, on the leg 32 of the piece 31. The ramp 36 forms an inclined plane between an end 37 and an end 38, enabling the said ramp to slide under the turned-over edge 35 of the wing 6.

The inclined shape of the ramp 36 imposes the direction of movement of the headlight 2 under the turned-over edge 35 of the wing 6, as shown by FIG. 10. The rotation of the headlight 2 causes the contact of the end 37 of the ramp 36 with the turned-over edge 35 of the wing 6. The end 37 is adapted to be inserted under the turned-over edge 35, so that the ramp 36 slides under the said turned-over edge 35, preventing any impact between the turned-over edge 35 and the leg 32.

FIG. 11 shows the headlight 2 at the end of its movement under the turned-over edge 35 of the wing 6. The inclination of the ramp 36 has allowed the sliding of the leg 32 under the turned-over edge 35 of the wing 6. There is therefore, between the leg 32 and the turned-over edge 35 of the wing 6, a protective space comprising the ramp 36. Thus, at the time of the collision, the leg 32 of the piece 36 does not strike the turned-over edge 35 of the wing 6 whatever the type of headlight.

Figure 12:
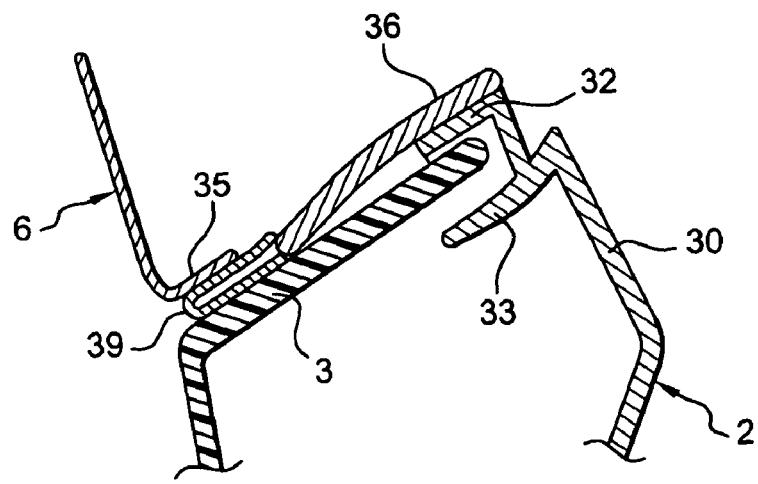
FIG. 12, FIG. 13 and FIG. 14 depict respectively second, third and fourth embodiments of the slide ramp.

In a second variant depicted in FIG. 12, a piece 39 is fixed to the protective glass 3. This piece 39, for example produced from a plastics material, is fixed to the end 37 of the ramp 36, for example by overmoulding. This piece 39 forms a spring blade, situated at the foot of the ramp 36. Thus, in the normal position, the turned-over edge 35 of the wing 6 is in abutment on the piece 39, compressing the said piece 39. This compression of the piece 39 enables the turned-over edge 35 to be placed on the same level of the end 37 of the ramp 36. When the piece 39 slides under the turned-over edge 35 of the wing 6, the piece 39 decompresses.

Figure 13:
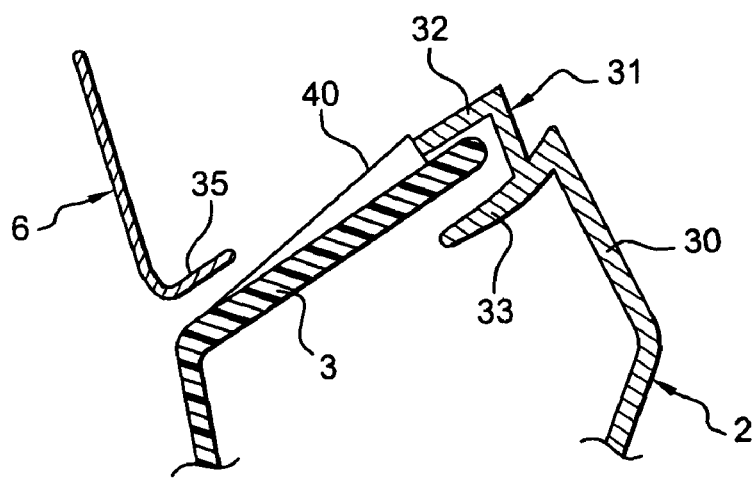

FIG. 13 shows a third variant of the ramp 36. In this variant, a protrusion 40 is fixed to the protective glass 3. This protrusion 40 is situated between the leg 32 of the piece 31 and the turned-over edge 35 of the wing 6. The protrusion 40 is formed by an inclined plane with the same level as the leg 32. Thus, when the leg has slid under the turned-over edge 35, the said turned-over edge is in abutment on the said leg 32. The protrusion 40 fulfils the same functions as the ramp 36.

Figure 14:
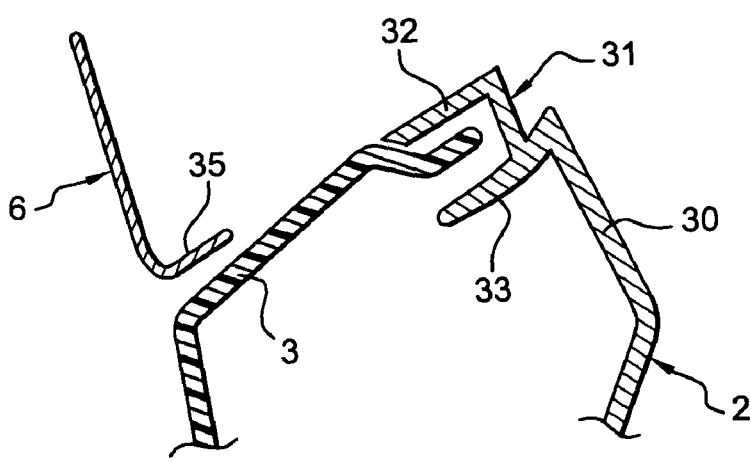

FIG. 14 shows a fourth variant of the ramp 36. In this variant, the protective glass 3 has a specific shape in the form of a ramp. In this case, the glass 3 is faceted in order to form a ramp. In this embodiment, it is the glass 3 itself that constitutes the ramp. This variant has the advantage of not requiring any additional manufacturing operation, the ramp being produced at the same time as the protective glass.

Whatever the variant, the ramp 3 assists the release of the headlight 2 on the side of the wing 6 when there is an impact with an impacter. Whether it be added or produced by the modification of the shape of the protective glass 3, the ramp 36 causes the offsetting of the headlight 2, thus preventing the wing 6 from being damaged.

What is claimed is:

1. A system for mounting a headlight on a motor vehicle, the headlight having a center of gravity and comprising a rigid housing closed by a protective glass, the system comprising:
   (a) a first connecting element coupled to the headlight and
   (b) a second connecting element coupled to the vehicle
   wherein one of the first and second connecting elements comprises a curved surface defining a curvilinear path and the other of the first and second connecting element comprises a surface that is configured to engage with and travel a distance along the curved surface defining the curvilinear path to provide curvilinear translational movement between the first and second connecting elements, and wherein the first and second connecting elements are disposed at least partially about a center of rotation of the headlight to provide rotational movement to the headlight relative to the vehicle when a force impacts a surface of the headlight.

2. The system according to claim 1, wherein a position of the center of rotation of the headlight is determined according to a shape of the protective glass of the headlight.

3. The system according to claim 1, wherein the position of the center of rotation is determined according to an optimum position of the headlight at the end of its rotational movement.

4. The system according to claim 1, wherein the center of rotation of the headlight is centered on the center of gravity of the headlight.

5. The system according to claim 1, wherein the first connecting element is coupled to a lateral zone of the headlight.

6. The system according to claim 1, wherein the second connecting element comprises a pair of generally parallel curved rails defining a curvilinear path therebetween and the first connecting element is configured to engage with and travel a distance along the curvilinear path.

7. The system according to claim 6, wherein the curvilinear path of the second connecting element and the first connecting element comprise at least one mechanical braking system.

8. The system according to claim 7, wherein the at least one mechanical braking system comprises a crenellated shape curvilinear path and a T shape first connecting element adapted to be inserted successively between crenellation on the curvilinear path.

9. The system according to claim 1, further comprising a ramp coupled to the headlight, wherein the ramp engages a turned-over edge of a wing of the vehicle to prevent impact between the headlight and the turned-over edge of the wing of the vehicle during the rotational movement of the headlight when a force impacts a surface of the headlight.

10. The system according to claim 9, wherein the ramp is coupled to the protective glass of the headlight.

11. The system according to claim 9, wherein the ramp is coupled to the housing of the headlight.

12. The system according to claim 11, wherein a compressible piece is disposed at an end of the ramp.

13. The system according to claim 9, wherein the ramp is faceted in the protective glass of the headlight.

14. A motor vehicle comprising at least one headlight and a system for mounting the headlight according to claim 1.

15. A system for mounting a headlight on a motor vehicle, the headlight having a center of gravity and comprising a rigid housing closed by a protective glass, the system comprising:
(a) a first connecting element coupled to the headlight and
(b) a second connecting element coupled to the vehicle wherein one of the first and second connecting elements comprises a surface defining a guide path and the other of the first and second connecting element comprises a surface that is configured to engage with and travel a distance along the surface defining the guide path to provide translational movement between the first and second connecting elements, and wherein the first and second connecting elements are disposed at least partially about a center of rotation of the headlight to provide rotational movement to the headlight relative to the vehicle when a force impacts a surface of the headlight.

16. The system according to claim 15, wherein the second connecting element comprises a pair of generally parallel rails defining a guide path and the first connecting element is configured to engage with and travel a distance along the guide path.

17. The system according to claim 16, wherein the guide path of the second connecting element and the first connecting element comprise at least one mechanical braking system.

18. The system according to claim 17, wherein the at least one mechanical braking system comprises a tapered shape guide path and a tapered shape first connecting element adapted to be inserted in the guide path.

* * * * *